(12) United States Patent
Arihana et al.

(10) Patent No.: US 9,074,630 B2
(45) Date of Patent: Jul. 7, 2015

(54) ROLLER BEARING

(75) Inventors: Miki Arihana, Kuwana (JP); Naoaki Tsuji, Kuwana (JP); Yoji Sato, Kuwana (JP); Hideyuki Tsutsui, Kuwana (JP); Kouya Oohira, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/130,555

(22) PCT Filed: Jul. 4, 2012

(86) PCT No.: PCT/JP2012/067079
§ 371 (c)(1),
(2), (4) Date: Jan. 2, 2014

(87) PCT Pub. No.: WO2013/005771
PCT Pub. Date: Jan. 10, 2013

(65) Prior Publication Data
US 2014/0153854 A1    Jun. 5, 2014

(30) Foreign Application Priority Data

Jul. 7, 2011  (JP) .................................. 2011-151101
Oct. 13, 2011  (JP) .................................. 2011-226117
Jun. 20, 2012  (JP) .................................. 2012-138597

(51) Int. Cl.
*F16C 19/00* (2006.01)
*F16C 19/20* (2006.01)
(Continued)

(52) U.S. Cl.
CPC ............. *F16C 33/3706* (2013.01); *F16C 19/20* (2013.01); *F16C 33/37* (2013.01); *F16C 33/6696* (2013.01)

(58) Field of Classification Search
CPC ...... F16C 19/20; F16C 19/44; F16C 33/6696; F16C 33/37; F16C 33/3706
USPC ......... 384/456, 462, 463, 520, 522, 523, 527, 384/551, 573, 579, 530
See application file for complete search history.

(56) References Cited

U.S. PATENT DOCUMENTS 1,996,841 A * 4/1935 Stevens ..................... 384/527
2,550,912 A * 5/1951 Goodwin et al. ............. 384/526
(Continued)

FOREIGN PATENT DOCUMENTS

JP      49-41230      11/1974
JP      63-152023     10/1988
(Continued)

OTHER PUBLICATIONS

International Preliminary Report on Patentability and Written Opinion of the International Searching Authority issued Jan. 16, 2014 in International (PCT) Application No. PCT/JP2012/067079.
(Continued)

*Primary Examiner* — James Pilkington
(74) *Attorney, Agent, or Firm* — Wenderoth, Lind & Ponack, L.L.P.

(57) ABSTRACT

A rolling bearing which is capable of preventing the rolling elements from dropping out from between the inner and the outer rings even when the separators have been worn to an advanced stage. A rolling bearing includes: a plurality of rolling elements arranged between an inner and an outer rings; and a plurality of prismatic separators disposed in a circumferential direction between the rolling elements. The separator includes integrally therewith a metal band on at least one of its outer surfaces including those which face the inner or the outer ring, or at least one of its axial side surfaces, excluding however, surfaces which face the circumferential direction and make contact with the rolling elements. The metal band has a narrower width than a width of the separator in the circumferential direction, and prevents wear of the separator from advancing beyond a certain extent.

13 Claims, 10 Drawing Sheets

(51) Int. Cl.
*F16C 33/37* (2006.01)
*F16C 19/40* (2006.01)
*F16C 33/66* (2006.01)

(56) References Cited

U.S. PATENT DOCUMENTS

| | | | | |
|---|---|---|---|---|
| 2,897,021 | A | * | 7/1959 | Zeilman .......................... 384/520 |
| 3,162,493 | A | * | 12/1964 | Hanau ............................ 384/527 |
| 3,455,616 | A | * | 7/1969 | George et al. ................. 384/520 |
| 3,712,694 | A | * | 1/1973 | Smith ............................ 384/520 |

| | | | |
|---|---|---|---|
| 2009/0274407 | A1 | * 11/2009 | Egami et al. .................. 384/606 |

FOREIGN PATENT DOCUMENTS

| | | |
|---|---|---|
| JP | 2000-320548 | 11/2000 |
| JP | 2005-3178 | 1/2005 |
| JP | 2009-30673 | 2/2009 |

OTHER PUBLICATIONS

International Search Report issued Jul. 31, 2012 in International (PCT) Application No. PCT/JP2012/067079.

* cited by examiner

ROLLER BEARING

TECHNICAL FIELD

The present invention relates to a rolling bearing which includes a plurality of rolling elements arranged between an inner and an outer rings and a plurality of separators disposed between the rolling elements in a circumferential direction. In particular, the present invention relates to a rolling bearing which is suitable as a bearing for tenter clips in plastic film stretching machines, or under high-temperature ambient or vacuum environment.

BACKGROUND ART

Bearings used for tenter clips in plastic film stretching machines require good heat resistance since they are used under a high-temperature ambient environment generally ranging from 150 through 250 degrees Celsius.

Especially, for such resins as PEEK and PI which are in increasing demand in recent years, the stretching operation is performed under a super-high ambient-temperature of 400 degrees Celsius.

In rolling bearings for use in such a super-high ambient temperature, separators made of a solid lubricant are placed between the rolling elements in order to supply lubricant by a small and constant amount at the super-high temperatures since there is no grease usable at such a high temperature as 400 degrees Celsius.

The rolling bearings which use such separators are disclosed in Patent Literature 1 and Patent Literature 2.

CITATION LIST

Patent Literature

Patent Literature 1: JP-A 2000-320548 Gazette
Patent Literature 2: JP-A 2005-3178 Gazette

SUMMARY OF INVENTION

Technical Problem

These rolling bearings, in which a plurality of separators are placed in a circumferential direction between the rollers, have a problem that the separators' contact surfaces with the rolling elements is subject to wear.

Especially when the separator is made of a solid lubricant, the separators wear at an accelerated pace.

As the separators continue to wear, gaps increase between the rolling elements which are disposed in the circumferential direction of the rolling elements, and as a total of the gaps exceeds a half of the bearing's circumferential length, then it becomes likely that the rolling elements will drop out from between the inner and the outer rings.

Therefore, it is an object of the present invention to provide a rolling bearing which is capable of preventing the rolling elements from dropping out from between the inner and the outer rings even when the separators have been worn to an advanced stage.

Solution to Problem

In order to achieve the object stated above, the present invention provides a rolling bearing which includes: a plurality of rolling elements arranged between an inner and an outer rings; and a plurality of prismatic separators disposed in a circumferential direction between the rolling elements. In this bearing, the separator includes integrally therewith a metal band on at least one of its outer surfaces including those which face the inner or the outer ring, excluding however, those surfaces which face the circumferential direction and make contact with the rolling elements. The metal band has a narrower width than a width of the separator in the circumferential direction.

A typical example of the rolling bearing according to the present invention is a deep groove ball bearing.

The metal band may be made of stainless steel, brass or a plated structural rolled steel (SS Material). However, in view of good slip and corrosion resistance, use of stainless steel or brass is more preferred.

The separator is formed of a solid lubricant such as graphite.

The separator formed of graphite should preferably have a graphite content of 80 through 98 volume percent.

The solid lubricant has a bending strength of 4 through 15 MPa, and a comparative abrasion quantity of 1.5 through $2.5 \times 10^{-5}$ mm$^3$/(N/m).

The metal band has a width selected from a range which will not allow the balls to drop off from between the inner and the outer rings when the separator has been worn.

Also, the metal band may be formed with teeth on its inner side surfaces which face side surfaces of the separator, for enhanced slip prevention between the separator and the metal band.

The separator has an increasingly shorter length in the circumferential direction on a radially more inner side, whereas a surface opposing the outer ring is at least partially flat or polygonal in the circumferential direction so that the metal band can be attached easily.

In order to prevent the metal band from moving in the circumferential direction, at least one of axial side surfaces of the separator is formed with a groove (radial groove) for prevention of the metal band from movement.

The metal band may have a narrowed width in the circumferential direction at its axially intermediate region on a surface of the separator which faces a track surface in the outer ring, for increased amount of lubricant supply to the track surfaces.

The region of the metal band narrowed in the circumferential direction may have a shape of a greater curvature than that of the balls. This arrangement provides a smaller area in a surface of the metal band which makes contact with the ball when the separator has been worn to an advanced state.

The separator's surfaces facing in the circumferential direction and making contact with the rolling elements may be flat.

For a purpose of positioning the separators, a ring may be inserted between the shield plate and the separators. The ring is made of a solid lubricant.

The positioning ring should preferably be made of graphite which contains graphite at a rate from 95 through 100 volume percent.

The rolling bearing according to the present invention is suitably used as a bearing particularly for tenter clips.

Next, as a second means for achieving the object, the present invention provides a rolling bearing which includes: a plurality of rolling elements arranged between an inner and an outer rings; and a plurality of separators disposed in a circumferential direction between the rolling elements. This bearing further includes an annular side plate on at least one axial side of the inner and the outer rings for prevention of axial dislocation of the separators. The side plate may have beam members for dividing the separators, which are arranged in the circumferential direction, into a plurality of groups in circumferential direction.

The side plate should preferably be disposed on both axial sides of the inner and the outer rings.

On an axially outer side of the side plate, a shield plate is disposed to seal between the inner and the outer rings.

The beam members may be columnar or prismatic.

The beam members can be formed of stainless steel material such as SUS 304, or brass. SUS 304 is more preferred in view of such problems as corrosion, but brass is more preferable in view of wear in the rolling elements or in view of more effective lubrication.

The beam member may be disposed between one separator and another, or through one separator by making a through-hole in the separator for the beam member and inserting the beam member through the through-hole.

The beam members may be columnar or prismatic having a polygonal section with four or a greater number of corners.

Also, the separator may be axially halved, and surfaces which make contact with the rolling elements may be formed with guide grooves for fitting contact with part of the corresponding balls which serve as the rolling elements.

Advantageous Effects of Invention

According to the present invention, as the separators wear, the rolling elements eventually come in contact with the metal bands, but the wear of the separators does not advance beyond that. Therefore, the rolling elements are prevented from dropping out from between the inner and the outer rings. Also, even if the separators have been worn, the metal bands between the rolling elements keep a total of gaps between the rolling elements to be smaller than a half of the circumference of the bearing, thereby preventing the bearing from falling off.

In addition, by making the metal bands of stainless steel which is superior in corrosion resistance, or of brass which is superior in slip characteristics, it becomes possible to obtain a long-life rolling bearing since good slip characteristics reduce damage to the rolling elements caused by contact with the metal band.

According to the second means, separators arranged in the circumferential direction are divided into a plurality of groups in the circumferential direction by the beam members. Division by the beam members into a plurality of groups in the circumferential direction prevents situations where all of the rolling element will gather at one side on the circumferential direction even when the separators have been worn to an advanced stage. This prevents the rolling elements from dropping out of the bearing.

DESCRIPTION OF EMBODIMENTS

Figure 1:
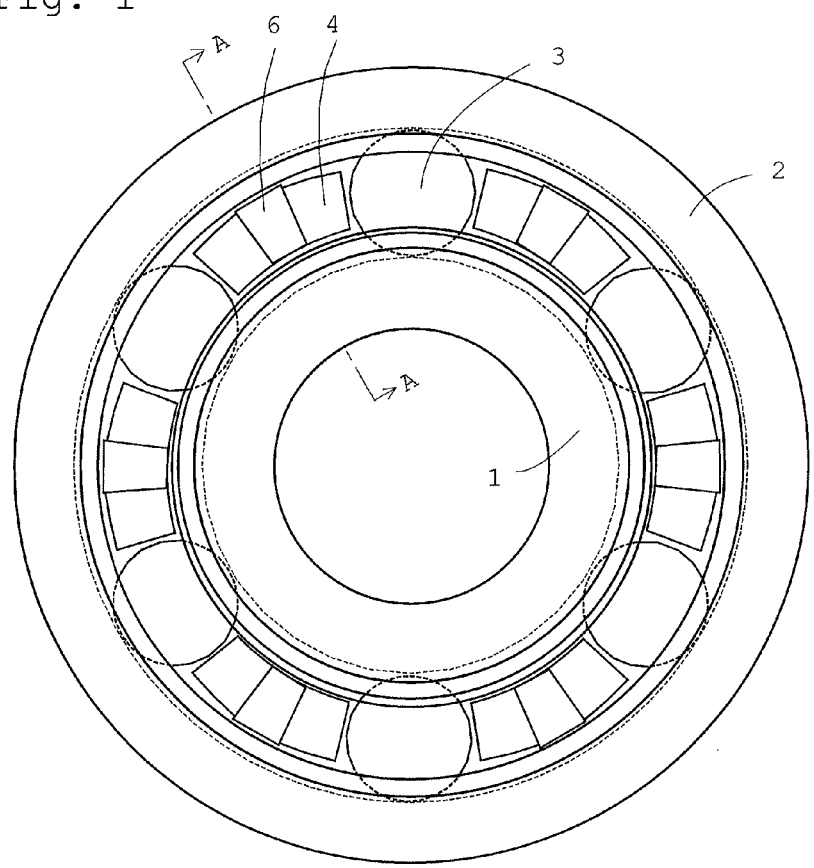
FIG. 1 is a side view of a deep groove ball bearing according to a first embodiment as an application of the present invention. The figure shows a state where a shield plate and a ring are removed.
Figure 2:
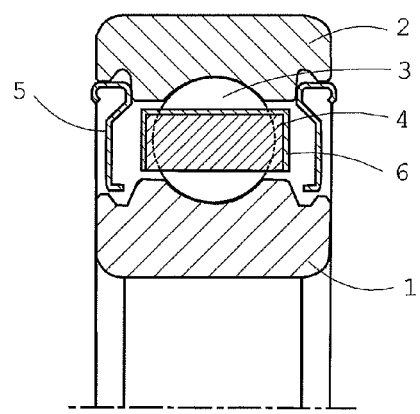
FIG. 2 is a sectional view taken in line A-A in FIG. 1.
Figure 3:
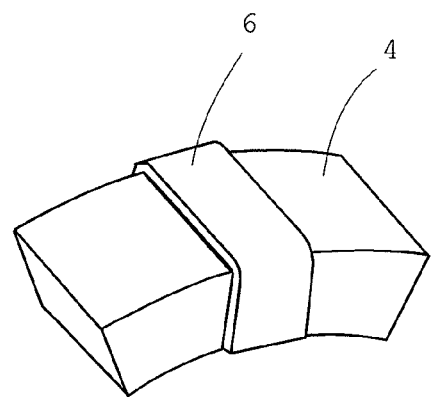
FIG. 3 is a perspective view of a separator, which has a metal band integrated therewith, for use in the embodiment in FIG. 1.

Hereinafter, embodiments of the present invention will be described.

FIG. 1 through FIG. 4 show a first embodiment of a deep groove ball bearing as an application of the present invention.

This deep groove ball bearing includes an inner ring 1; an outer ring 2; a plurality of balls 3 arranged between the inner ring 1 and the outer ring 2; and a plurality of separators 4 placed in a circumferential direction between the balls 3.

The inner ring 1 has its outer circumferential surface whereas the outer ring 2 has its inner circumferential surface, each formed with a track surface. The inner circumferential surface of the outer ring 2 has shoulder regions, each formed with a radially outward receding circumferential groove.

The balls 3 are placed between the track surface of the inner ring 1 and that of the outer ring 2.

In each of the circumferential grooves formed along the shoulder region in the inner circumferential surface of the outer ring 2, a shield plate 5 which seals a space between the inner ring 1 and the outer ring 2 is fitted. The shield plate 5 has a tip, which is opposed to the shoulder region of the outer circumferential surface of the inner ring 1 with a tiny gap therebetween.

Figure 4:
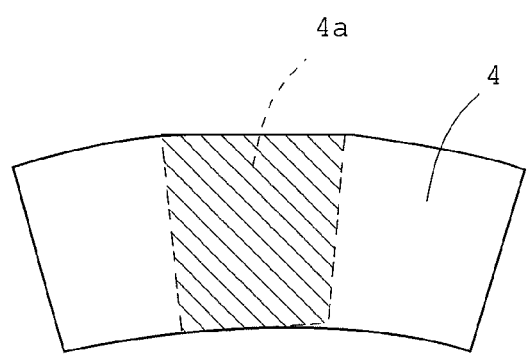
FIG. 4 is a side view, showing a shape of the separator before integrated with the metal band.

As shown in FIG. 4, the separator 4 is substantially prismatic, being formed so as to have an increasingly shorter length in circumferential direction on a radially more inner side, whereas a surface opposing the outer ring is at least partially flat or polygonal in the circumferential direction so that the metal band 6 can be attached easily. In FIG. 4, a reference symbol 4a represents the flat surface.

The separator 4 is made of a solid lubricant. As the separator 4 rotates, it makes contact with the balls 3, transfers the lubricant from the separator 4 to surfaces of the balls 3 and rotating contact regions in the track surfaces of the inner ring 1 and of the outer ring 2, thereby lubricating respective regions.

Examples of the solid lubricant to constitute the separator include layered substances such as graphite, tungsten disulfide and molybdenum disulfide; soft metals such as gold, silver and lead; polymeric resins such as PTFE and polyimide; and compound materials containing any of these substances as a primary ingredient.

The separator 4 integrally has a metal band 6 on at least one surface of its outer surfaces which oppose a surface of the inner and outer rings 1, 2 excluding surfaces which make contact with the ball 3. The metal band 6 has a narrower width than the width of the separator 4 in the circumferential direction, and in the embodiment shown in FIG. 1 through FIG. 4, is integrated with all surfaces excluding the surfaces facing the circumferential direction, i.e., the surfaces which make contact with the balls 3, and one more surface which is opposed to the inner ring 1.

As for materials for the metal band 6, corrosion resistant stainless steel or slippery brass is more preferred.

The width of the metal band is selected from a range which will not allow the balls 3 to drop off from between the inner and the outer rings 1, 2 when the separator 4 has been worn.

Figure 8:
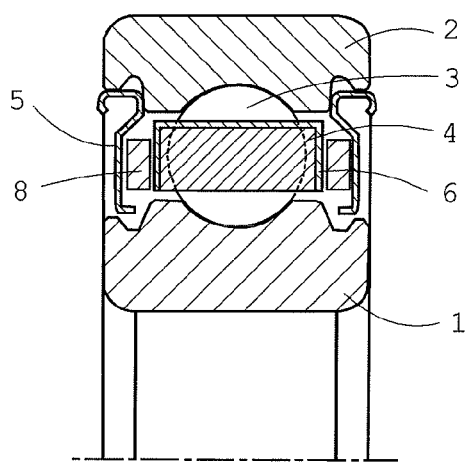
FIG. 8 is a sectional view showing a deep groove ball bearing according to a second embodiment as an application of the present invention.
Figure 9:
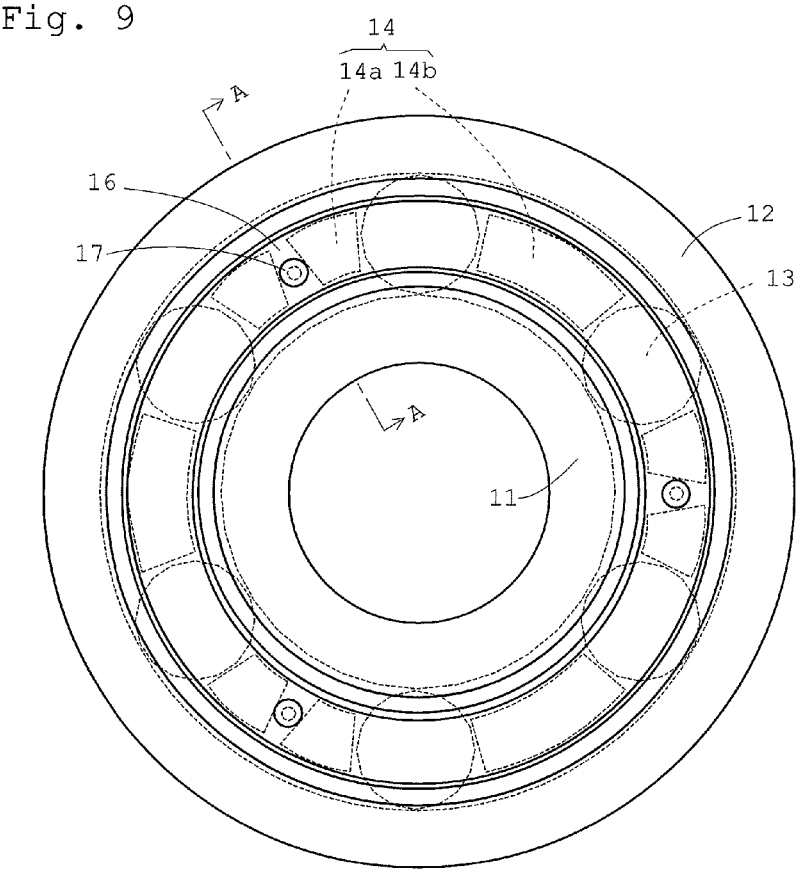
FIG. 9 is a side view of a deep groove ball bearing according to a first embodiment as an application of the second means. The figure shows a state with a shield plate removed.
Figure 10:
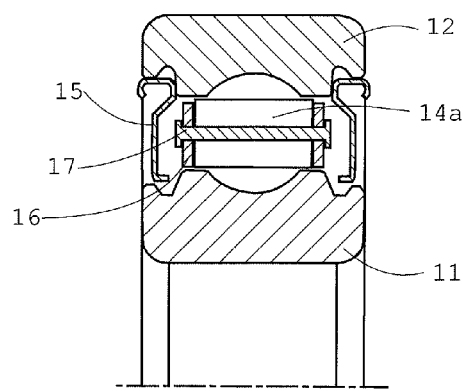
FIG. 10 is a sectional view taken in line A-A in FIG. 9.
Figure 11:
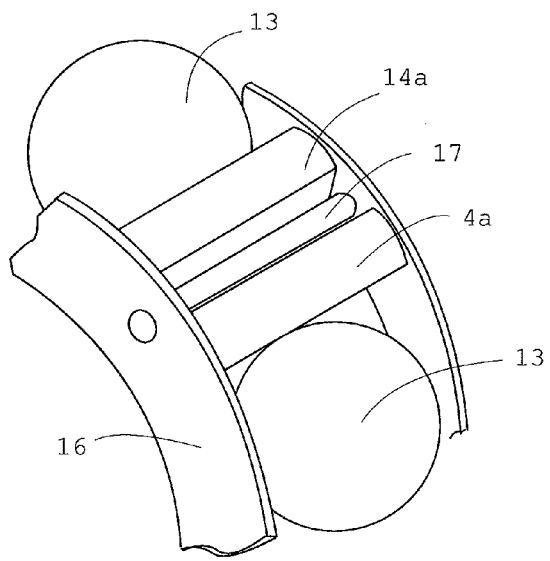
FIG. 11 is a partial perspective view, showing a relationship between balls and the separator according to the embodiment in FIG. 9.
Figure 12:
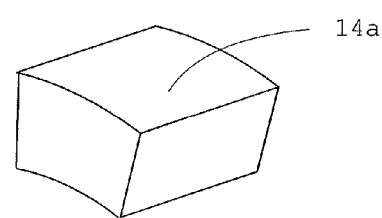
FIG. 12 is a perspective view of a first separator for use in the embodiment in FIG. 9.
Figure 13:
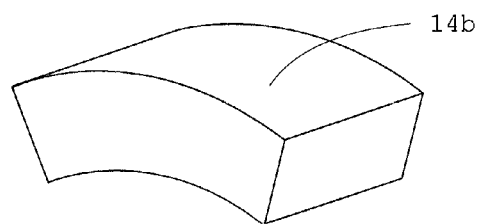
FIG. 13 is a perspective view of a second separator for use in the embodiment in FIG. 9.

Also, for the purpose of positioning the separators 4, a ring 8 may be inserted as shown in FIG. 8, between the shield plate 5 and the separators 4. The ring 8 is made of a solid lubricant.

Figure 5:
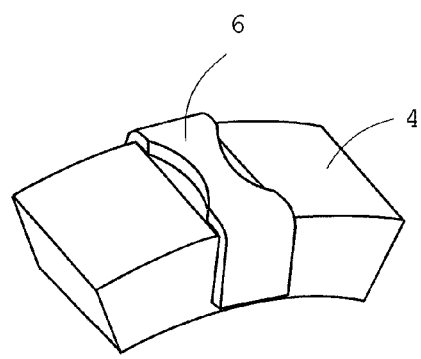
FIG. 5 is a perspective view of a separator integrated with a metal band, according to another embodiment.

Also, as shown in FIG. 5, the metal band 6 may have a narrowed width in the circumferential direction at its axially intermediate region on a surface of the separator 4 which faces a track surface in the outer ring. This increases the amount of lubricant supplied to the track surfaces.

The region of the metal band 6 narrowed in the circumferential direction has a shape having a greater curvature than that of the balls 3. This arrangement provides a smaller surface contact between the metal band 6 and the balls 3 when the separator 4 has been worn to an advanced state.

Figure 6:
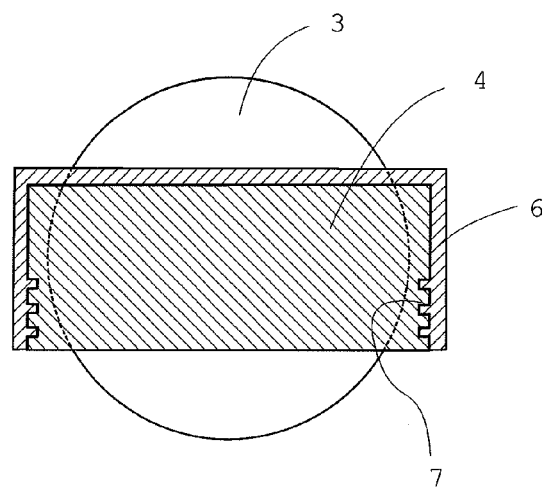
FIG. 6 is a sectional view of a separator integrated with a metal band, according to still another embodiment.

Also, as shown in FIG. 6, teeth 7 may be formed on inner side surfaces of the metal band 6 which faces side surfaces of the separator 4 for enhanced slip prevention between the separator 4 and the metal band 6.

Figure 7:
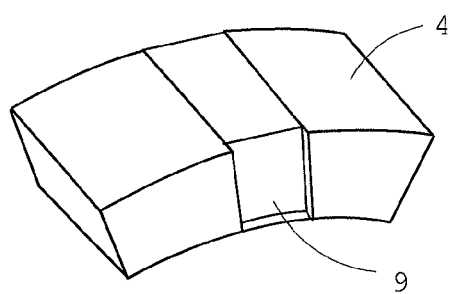
FIG. 7 is a side view, showing a shape of a separator before integrated with a metal band according to still another embodiment.

Also, in order to prevent the metal band 6 from moving in the circumferential direction, as shown in FIG. 7, at least one of the two axial side surfaces of the separator 4 may be formed with a groove 9 (radial groove) for prevention of the metal band 6 from movement.

The positioning ring 8 and the separators 4 should preferably be made of graphite which is a material particularly superb in lubricating ability among many solid lubricants. Graphite content of these components should be 80 through 98 volume percent for the separator 4, and 95 through 100 volume percent for the ring 8. By selecting a comparative abrasion quantity of $1.5 \times 10^{-5}$ mm$^3$/(N/m) for the separator 4, sufficient lubrication is ensured, and by giving a bending strength of not lower than 4 MPa, fracture of the separator during operation is prevented.

Further, an upper limit of the comparative abrasion quantity for the separator 4 should be $2.5 \times 10^{-5}$ mm$^3$/(N/m). This prevents premature failure of the bearing caused by powdery dust which clogs inside the bearing as the separator 4 is being worn. Also, if the bending strength of the separator 4 is too high and the separator 4 is a tilted position during operation, the inner and the outer rings is likely to be locked, which will stop the bearing. Thus, in order to avoid locking between the inner and the outer rings, an upper limit of the bending strength should be 15 MPa.

The separators 4 can also be formed as a sintered product of graphite and a binder. The binder should preferably contain at least one metal selected from a group of Fe, Cu, Ni, W, Sn, Co and Cr, or at least one of oxides, nitrides or borides of any of these metals. Also, at least one of the separator 4 and the ring 8 can be formed by means of cold isostatic press (CIP), extrusion molding or compression molding method.

As described thus far, by using graphite as a material for forming the separators 4 and the rings 8 which are assembled into the rolling bearing; by using a graphite content percentage from 95 through 100 volume percent for the rings 8 and 80 through 98 volume percent for the separators 4; and by using the bending strength of 4 through 15 MPa and the comparative abrasion quantity of 1.5 through $2.5 \times 10^{-5}$ mm$^3$/(N/m) for the separators 4; it becomes possible to ensure sufficient lubrication inside the bearing, to prevent the dust of the separators 4 from clogging, to prevent the separators 4 from fracturing or locking during operation. Therefore, the invention maintains good lubrication between the rolling surfaces in the inner and the outer rings and the rolling elements for a long period of time, making it possible to increase the life of the bearing.

FIG. 9 through FIG. 13 show a first embodiment of a deep groove ball bearing as an application of the second means.

This deep groove ball bearing includes an inner ring 11; an outer ring 12; a plurality of balls 13 arranged between the inner ring 11 and the outer ring 12; and a plurality of separators 14 placed in a circumferential direction between the balls 13.

The inner ring 11 has its outer circumferential surface and the outer ring 12 has its inner circumferential surface, each formed with a track surface. The inner circumferential surface of the outer ring 12 has shoulder regions each formed with a radially outward receding circumferential groove.

The balls 13 are placed between the track surface of the inner ring 11 and that of the outer ring 12.

In each of the circumferential grooves formed along the shoulder region in the inner circumferential surface of the outer ring 12, a shield plate 15 which seals a space between the inner ring 11 and the outer ring 12 is fitted. The shield plate 15 has a tip, which is opposed to the shoulder region of the outer circumferential surface of the inner ring 11 with a tiny gap therebetween.

The separator 14 is constituted by: a first separator 14a which is constituted by a pair of pieces, sandwiching therebetween a beam member 17 which will be described later; and a second separator 14b; and is placed so as to separate two of the balls 13 which are adjacent to each other in the circumferential direction in a space between the inner ring 11 and the outer ring 12.

Annular side plates 16 are on two axial sides of the first separators 14a and the second separators 14b, for preventing the first separators 14a and the second separators 14b from escaping in an axial direction.

The two side plates 16 disposed on the two axial sides of the first separators 14a and the second separators 14b are connected with each other by the beam members 17 each disposed between the paired two pieces which constitute the first separator 14a.

In the embodiment shown in FIG. 9 through FIG. 13, three sets of first separators 14a are disposed in the circumferential direction. Therefore, the first separators 14a and the second separators 14b which are arranged in the circumferential direction are divided by the three beam members 17 into three groups in the circumferential direction.

The separator 14 is made of a solid lubricant. As the separator 14 rotates, it makes contact with the balls 13, and transfers the lubricant from the separator 14 to surfaces of the balls 13 and rotating contact regions in the track surfaces of the inner ring 11 and of the outer ring 12, thereby lubricating respective regions.

Examples of the solid lubricant to constitute the separator 14 include layered substances such as graphite, tungsten disulfide and molybdenum disulfide; soft metals such as gold, silver and lead; polymeric resins such as PTFE and polyimide; and compound materials containing any of these substances as a primary ingredient.

The separator 14 is substantially prismatic, being formed so as to have an increasingly shorter length in the circumferential direction on a radially more inner side.

The separator 14 makes contact with the balls on its flat surfaces in the embodiment shown in FIG. 9 through FIG. 13. However, these surfaces may be formed as concave surfaces so as to fit on part of the balls 13.

The separator 14 has a convex, arc-shaped surface which faces the outer ring 12. The convex, arc-shaped surface has a smaller curvature radius than that of the inner circumferential surface in the outer ring 12. However, the convex, arc-shaped surface may have a larger curvature radius than that of the inner circumferential surface in the outer ring 12. Also, the convex, arc-shaped surface may have a flat center region.

The separator 14 has a surface which faces the inner ring, and this surface is formed as a concave, arc-shaped surface which has the same curvature as of the outer circumferential surface in the inner ring 1, or is formed as a flat surface.

Materials which can be used for the side plates 16 include, for example, stainless steels such as SUS304, and brass.

Materials which can be used for the beam members 17 connecting the side plates 16 include, for example, stainless steels such as SUS304, and brass. The side plates 16 and the beam members 17 can be connected with each other by various means, such as welding, swaging, and forming a fitting tab and a corresponding fitting recess in respective parts.

In cases where the beam member 17 is made of brass, the arrangement offers an advantage of reduced damage caused to the balls 13 when the beam member 17 comes into contact with the balls 13 as a consequence of advanced wear in the separator 14.

The beam member 17 is columnar, having a round section in the embodiment in FIG. 9 through FIG. 13. However, it may have a square section or a polygonal section which has more than four corners.

Figure 14:
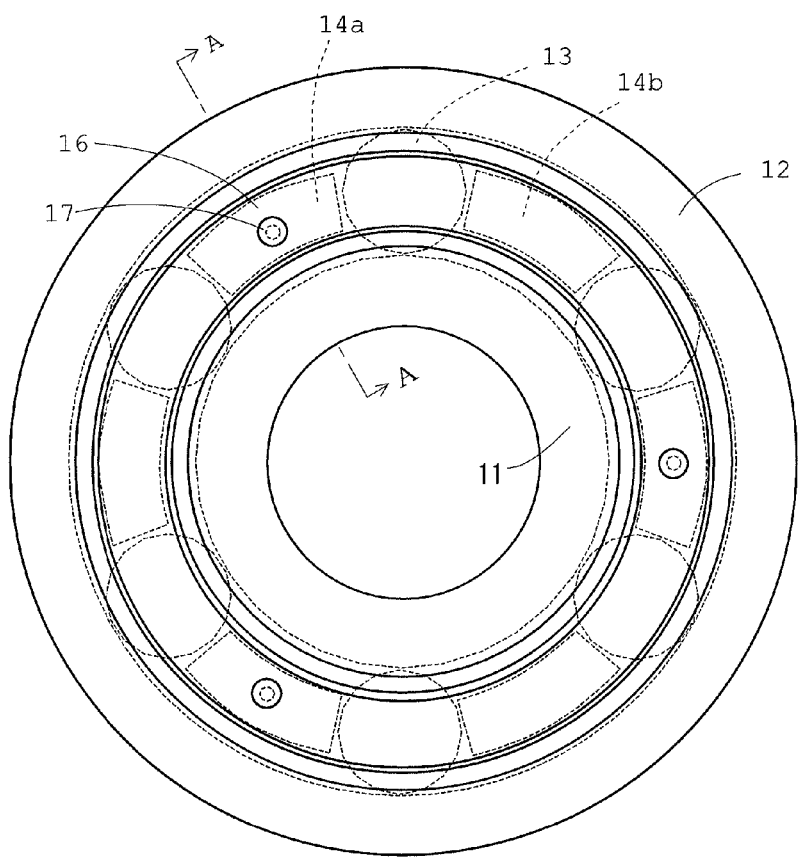
FIG. 14 is a side view of a deep groove ball bearing according to a second embodiment as an application of the second means. The figure shows a state with a shield plate removed.
Figure 15:
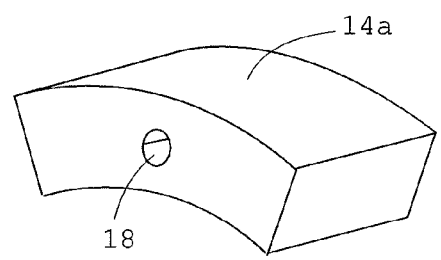
FIG. 15 is a perspective view of a first separator for use in the embodiment in FIG. 14.
Figure 16:
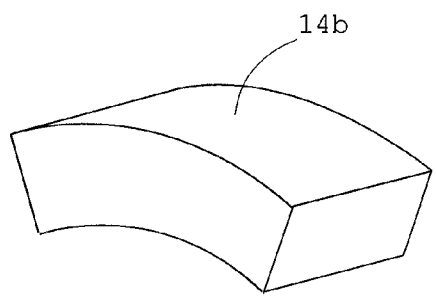
FIG. 16 is a perspective view of a second separator for use in the embodiment in FIG. 14.

FIG. 14 shows a second embodiment as an application of the second means. Whereas the first separator 14a is provided by a pair of two pieces in the embodiment shown in FIG. 9 through FIG. 13, it is now provided by a single member, and as shown in FIG. 15, the first separator 14a is now formed with a through-hole 18 for insertion of the beam member 17. The second separator 14b is the same as the first separator 14a, having the same length in the circumferential direction but does not have the through-hole 18.

Figure 17:
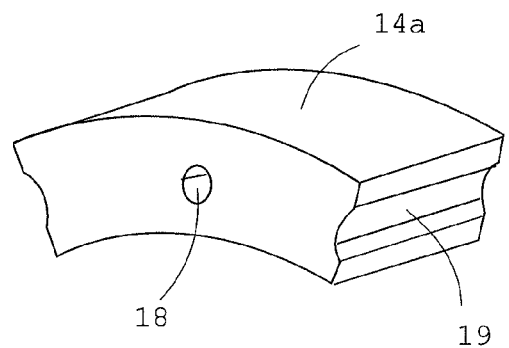
FIG. 17 is a perspective view, showing another example of the first separator of the deep groove ball bearing as an application of the second means.
Figure 18:
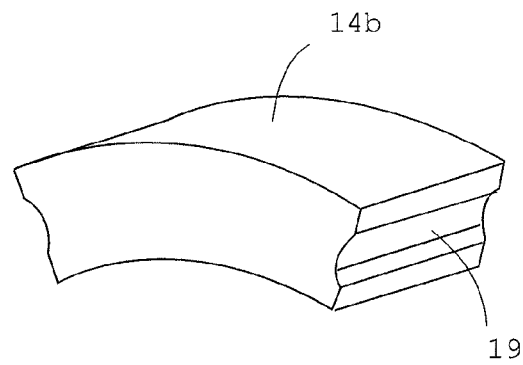
FIG. 18 is a perspective view, showing another example of the second separator of the deep groove ball bearing as an application of the second means.

FIG. 17 and FIG. 18 show another embodiment of the separator 14 as an application of the second means. FIG. 17 shows a first separator 14a formed with a through-hole 18 for insertion of the beam member 17. Note that a guide groove 19 is formed on each side in the circumferential direction for guiding the ball 13. FIG. 18 shows a second separator 14b to be assembled with the separator 14a in FIG. 17. Note that a guide groove 19 is formed on each side in the circumferential direction for guiding the ball 13.

Figure 19:
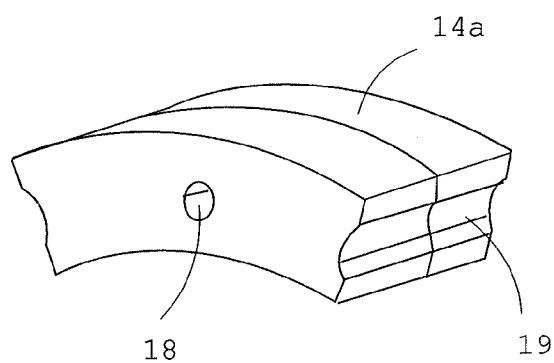
FIG. 19 is a perspective view, showing still another example of the first separator of the deep groove ball bearing as an application of the second means.
Figure 20:
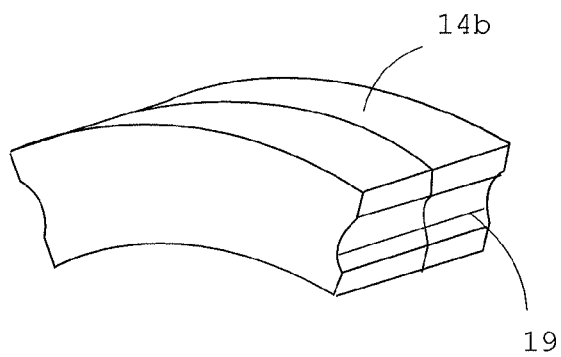
FIG. 20 is a perspective view, showing still another example of the second separator of the deep groove ball bearing as an application of the second means.

FIG. 19 and FIG. 20 show still another embodiment of the separator 14 as an application of the second means. FIG. 19 shows a first separator 14a formed with a through-hole 18 for insertion of the beam member 17. Note that a guide groove 19 is formed on each side in the circumferential direction for guiding the ball 13, and that the separator is axially halved. FIG. 20 shows a second separator 14b to be assembled with the separator 14a in FIG. 19. Note that a guide groove 19 is formed on each side in the circumferential direction for guiding the ball 13, and that the separator is axially halved.

REFERENCE SIGNS LIST 1 inner ring
2 outer ring
3 ball
4 separator
4a flat surface
5 shield plate
6 metal band
7 teeth
8 ring
9 groove

The invention claimed is:

1. A rolling bearing comprising:
   a plurality of rolling elements arranged between an inner ring and an outer ring; and
   a plurality of separators made of a solid lubricant and disposed in a circumferential direction between the rolling elements,
   wherein the separator includes integrally therewith a metal band on at least one of its outer surfaces including those which face the inner ring or the outer ring, excluding surfaces which face the circumferential direction and make contact with the rolling elements;
   wherein the metal band includes an inner surface having teeth, and the separator has a side surface having teeth that engage with the teeth on the inner surface of the metal band, and
   wherein a width of the metal band is narrower than a width of the separator in the curcumferential direction, and the width of the metal band having a value that prevents the rolling elements from droppping from between the inner and outer rings even when the separator is worn.

2. The rolling bearing according to claim 1, wherein the rolling elements are balls.

3. The rolling bearing according to claim 1, wherein the metal band is made of stainless steel or brass.

4. The rolling bearing according to claim 1, wherein the solid lubricant comprises graphite.

5. The rolling bearing according to claim 4, wherein the solid lubricant contains graphite at a rate from 80 through 98 volume percent.

6. The rolling bearing according to claim 1, wherein the solid lubricant has a bending strength from 4 through 15 MPa, and a comparative abrasion quantity from 1.5 through 2.5× $10^{-5}$ mm$^3$/(N/m).

7. The rolling bearing according to claim 1, wherein the separator's surface which faces the outer ring is at least partially flat or polygonal in the circumferential direction.

8. The rolling bearing according to claim 1, wherein the separator has at least one axial side surface formed with a groove for prevention of movement of the metal band.

9. The rolling bearing according to claim 1, wherein the metal band has a narrowed width in the circumferential direction at its axially intermediate region on a surface of the separator facing a track surface formed in the outer ring.

10. The rolling bearing according to claim 9, wherein the region of the metal band narrowed in the circumferential direction has a curved surface of a greater curvature than that of the rolling element used.

11. The rolling bearing according to claim 1, wherein the separator's surfaces facing in the circumferential direction and making contact with the rolling elements are flat.

12. The rolling bearing according to claim 1, further comprising positioning rings made of the solid lubricant,
> wherein a shield plate sealing a space between the inner ring and the outer ring is fitted in each of circumferential grooves formed along a shoulder region in an inner circumferential surface of the outer ring,
> wherein each of the positioning rings is disposed between the shield plate and the separators.

13. The rolling bearing according to claim 12, wherein at least one of the positioning rings is made of material containing graphite at a rate from 95 through 100 volume percent.

* * * * *